(12) United States Patent
Sarkisian et al.

(10) Patent No.: US 7,103,561 B1
(45) Date of Patent: Sep. 5, 2006

(54) METHOD OF PROFILING NEW VEHICLES AND IMPROVEMENTS

(75) Inventors: Andrew Sarkisian, Commerce Twp., MI (US); John V. Felice, Farmington Hills, MI (US); James C. Schroer, Rochester Hills, MI (US); John Williamson, Saline, MI (US); Richard E. Van House, Ann Arbor, MI (US); Thom F. Foxlee, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 477 days.

(21) Appl. No.: 09/395,455

(22) Filed: Sep. 14, 1999

(51) Int. Cl.
*G06F 17/30* (2006.01)
(52) U.S. Cl. .................................. 705/10
(58) Field of Classification Search .................. 705/10
See application file for complete search history.

(56) References Cited

U.S. PATENT DOCUMENTS

| | | | | |
|---|---|---|---|---|
| 5,041,972 A | * | 8/1991 | Frost | 705/10 |
| 5,124,911 A | * | 6/1992 | Sack | 705/10 |
| 5,278,751 A | * | 1/1994 | Adiano et al. | 705/10 |
| 5,991,734 A | * | 11/1999 | Moulson | 358/447 |
| 6,009,407 A | * | 12/1999 | Garg | 705/10 |
| 6,029,195 A | * | 2/2000 | Herz | 725/116 |
| 6,070,149 A | * | 5/2000 | Tavor et al. | 705/26 |
| 6,078,740 A | * | 6/2000 | DeTreville | 703/22 |
| 6,098,048 A | * | 8/2000 | Dashefsky et al. | 340/438 |
| 6,236,955 B1 | * | 5/2001 | Summers | 434/107 |
| 6,236,978 B1 | * | 5/2001 | Tuzhilin | 705/1 |
| 6,298,348 B1 | * | 10/2001 | Eldering | 705/36 R |
| 6,322,368 B1 | * | 11/2001 | Young et al. | 434/219 |
| 6,408,263 B1 | * | 6/2002 | Summers | 703/6 |
| 6,493,678 B1 | * | 12/2002 | Foster et al. | 705/28 |

FOREIGN PATENT DOCUMENTS

| | | | |
|---|---|---|---|
| JP | 11066156 A | * | 3/1999 |
| WO | WO 9912115 A1 | * | 3/1999 |

OTHER PUBLICATIONS

McCarthy, E. Jerome and William Perreault. Basic Marketing: A Global Managerial Approach. Richard D. Irwin. Inc. 1993. vol. 11. p. 47-48, 57, 78-106.*
Higgins, Kevin. "The Value of Customer Value Analysis." Marketing Research. Chicago Winter 1998. vol. 190. Issue 4. pp. 38-44.*
Goldberg, Aaron. "From Prospect to Sale." Marketing Computers. New York. Apr. 1995. vol. 15, Iss. 4 p. 18.*
Eisner, Howard. "Essentials of Project and Systems Engineering Management". John Wiley & Sons, Inc. 1997.*

(Continued)

*Primary Examiner*—Catherine M. Tarae
(74) *Attorney, Agent, or Firm*—David B. Kelley; Artz & Artz

(57) ABSTRACT

A method of developing product characteristics for a new automotive vehicle comprising the steps of: generating a plurality of vehicle attributes including usage experience attributes, driving experience attributes, and design attributes; classifying each of the attributes; generating a preferred vehicle brand position as a function of the vehicle attributes; and, generating target vehicle characteristics as a function of the vehicle attributes and the preferred vehicle brand position. In this manner, the target vehicle characteristics represent customer-driven objectives for each of the plurality of vehicle attributes. An advantage of the present method is that it provides customer-driven products with identifiable brand images.

24 Claims, 14 Drawing Sheets

OTHER PUBLICATIONS

Leonard, Nancy and Sandra Morgan. "Developments in Business Simulation and Experimental Learning". Association for Business Simulation and Experimental Learning. 1998.*

McCarthy, E. Jerome and William Perreault. Basic Marketing: A Global Managerial Approach. Richard D. Irwin, Inc. 1993. vol. 11, p. 47-48, 57, 78-106.*

Van Auken, Stuart and Authur Adams. "Attribute Updating Through Across-Class, Within-Category Comparison Advertising". Journal of Advertising Research. Mar./Apr. 1998.*

McMahon, Debra. "Brand Battles". Telephony. Jul. 1998.*

Cooper et al., "Building market structures from consumer preferences," JMR, Journal of Marketing Research, Aug. 1996 [retrieved from Proquest].*

Viswanathan et al. "Understanding how product attributes influence product categorization: Development and validation of fuzzy set-based measures of gradedness in product categories," JMR, Journal of Marketing Research, Feb. 1999 [Proquest].*

Easingwood, Christopher. "Marketplace success factors for new financial services," The Journal of Services Marketing, 1993 [retrieved from Proquest].*

Keller, Kevin. "Managing brands for the long run: Brand reinforcement and revitalization," California Management Review, Spring 1999 [retrieved from Proquest].*

Innis, Daniel E. et al. "Customer service : The key to customer satisfaction, customer loyalty, and market share," Journal of Business Logistics, 1994 [retrieved from Dialog].*

Turley, LW et al. "Brand name strategies in the service sector," Journal of Consumer Marketing, 1995 [retrieved from Dialog].*

"Maximizing potential," Apparel Industry Magazine, May 1998 [retrieved from Dialog].*

Boyd, Thomas et al. "The link between attractiveness of "extrabrand" attributes and the adoption of innovations," Journal of the Academy of Marketing Science, Summer 1999 [retrieved from Dialog].*

Malhotra, Naresh K et al. "Marketing research: A state-of-the-art review and directions for the twenty-first century," Journal of the Academy of Marketing Science, Spring 1999 [retrieved from Dialog].*

* cited by examiner

Brand Positioning Summary

32 — Target Customer Defining Characteristics
- Strong desire to experience the "real" outdoors. True adventure.
- Highly motivated & driven for success and achievement.
- Need to escape from the stress / pressure of their weekdays to family oriented weekend activities in the Great Outdoors.

34 — Target Customer Selection Rational
Needs Based Segmentation:
Target Segment - Big, Rugged, and For Me.
Key Adjacent / Consumption Segments - Workhorse, Comfortable Shuttle
- Provides Aspirational Target - Outdoor activity image leaders.
- Strong positive halo for Ford Primary and Ford Division SUV line-up.
- High interest in Truck capabilities (e.g. 4X4, Towing and Hauling).
- Strong interest in SUV. Needs +7 passenger seating.
- Vehicle is a way of rewarding themselves.

36 — Role in Portfolio
- The "Rugged Adventure" leader of the Ford SUV line-up.
- Supports the Ford Division core SUV DNA of Confident, Rugged, Refined and Versatile.
- Reinforces Ford Truck Heritage - Built Ford Tough SUV.
- Contributes to Ford Division positioning as the industry leader providing the broadest SUV line-up.

38 — Competitive Assessment
[Identify and summarize competitive products and corresponding attributes]

40 — Enduring Why Buys
- Capability to master any environment. Best balance of true off-road capability, ride comfort and maneuverability.
- Superior comfort through innovative interior versatility, ergonomics and advanced technology.
- Rugged styling providing a statement of my success and adventurous lifestyle
- Environmentally responsible. Lowest emissions and highest recyclability.

42 — Pricing Considerations
- Pricing actions must insure adequate walk in terms of MSRP, transaction price and customer payment relative to other Ford Division SUV entries.
- Showroom priced between the competition.
- Pricing and variable marketing execution must be consistent with Premium Brand image.

FIG. 2

Brand Profiler - Personal Use Vehicle

| Attribute | Attribute Class | Priority (Rank) | Primary Brand Positioning | Nameplate Brand Positioning | Program Specifics Target/Objectives | Program Specifics Status | Present Nameplate Entry | Detailed Definition (see last page for a general description of each attribute) |
|---|---|---|---|---|---|---|---|---|
| Usage Experience | | | | | | | | |
| Interior Roominess | D | 1 | ①A C M | ①A C M | L A C M | L A C M | ①A C U | Package is top purchase motivator vs. other size SUV's. (Front row = 2nd/3rd row adv. vs. Sub). |
| Ergonomics / Flexibility / Comfort | D | 2 | L Ⓐ C M | ①A C M | L A C M | L A C M | ①A C U | Interior seating/comfort on long trips important. |
| Luggage / Cargo Space | D | 3 | ①A C M | ①A C M | L A C M | L A C M | L Ⓐ C U | Ability to carry BOTH people and cargo is a key segment differentuator. |
| Durability / Craftsmanship | D | 6 | L Ⓐ C M | L Ⓐ C M | L A C M | L A C M | L Ⓐ C U | Have to deliver tough, capable and adventurous personality. |
| Quietness | -I | 8 | L Ⓐ C M | L Ⓐ C M | L A C M | L A C M | L Ⓐ C U | NVH levels that support premium presence. (5.4L U, 6.8L A, in research). |
| Ease of Entry / Exit | I | 11 | L Ⓐ C M | L Ⓐ C M | L A C M | L A C M | L Ⓐ C U | Easy access to 3rd row important. (1st row disadv., 2nd/3rd row adv.). |
| Range / Fuel Economy | G | 15 | L Ⓐ C M | L Ⓐ C M | L A C M | L A C M | L Ⓐ C U | Need competitive FE at minimum, range is key since long trips is a frequent use. |
| Climate Control | G | 17 | ①A C M | L A Ⓒ M | L A C M | L A C M | ①A C U | A comfortable experience for all passengers. |
| Exterior Visibility | G | 20 | L Ⓐ C M | L A Ⓒ M | L A C M | L A C M | ①A C U | Maximize visibility to support driving confidence. |
| Cost of Ownership | G | 25 | L Ⓐ C M | L A Ⓒ M | L A C M | L A C M | L Ⓐ C U | Good value is important, but operating cost is not a high priority like on commercial applications. |

FIG. 4A

Brand Profiler - Continued

| Attribute | Attribute Class | Priority (Rank) | Primary Brand Positioning | Nameplate Brand Positioning | Program Specifics Target / Objectives | Status | Present Nameplate Entry | Detailed Definition (see last page for a general description of each attribute) |
|---|---|---|---|---|---|---|---|---|
| Driving Experience | | | | | | | | |
| Performance / Towing | D | 4 | L ⒶC M | ⓁA C M | L A C M | L A C M | ⓁA C U | Full powertrain line-up w/BIC towing (Power & Pick-up on 5.4L U, 6.8L A). |
| Ride | I | 9 | L ⒶC M | L ⒶC M | L A C M | L A C M | L Ⓐ C U | A smooth ride on all surfaces and in all conditions. |
| Handling | G | 16 | L ⒶC M | L A Ⓒ M | L A C M | L A C M | L Ⓐ C U | Responsive handling that instills confidence. |
| Braking | G | 18 | L ⒶC M | L A Ⓒ M | L A C M | L A C M | Ⓛ A C U | Smooth and predictable braking that delivers confidence. |
| Steering | G | 19 | ⓁA C M | L A Ⓒ M | L A C M | L A C M | Ⓛ A C U | Precise steering that instills confidence. |
| Transmission Performance | G | 21 | L ⒶC M | L A Ⓒ M | L A C M | L A C M | Ⓛ A C U | Smooth shifting. |
| Maneuverability | G | 23 | L ⒶC M | L A Ⓒ M | L A C M | L A C M | Ⓛ A C U | Maximize maneuverability without sacrificing capability. |
| Environmental Responsibility | | | | | | | | |
| Occupant Safety | D | 5 | ⓁA C M | ⓁA C M | L A C M | L A C M | Ⓛ A C U | Important to deliver confidence in any situation & driven by corporate strategy |
| Occupant Security | I | 13 | Ⓛ A C M | Ⓛ A C M | L A C M | L A C M | Ⓛ A C U | Features that deliver confidence in any situation. |
| Vehicle Security | G | 22 | L A Ⓒ M | L A Ⓒ M | L A C M | L A C M | Ⓛ A C U | |
| Emissions | G | 27 | ⓁA C M | ⓁA C M | L A C M | L A C M | Ⓛ A C U | Leadership driven by corporate strategy |
| Recyclability | G | 28 | Ⓛ A C M | Ⓛ A C M | L A C M | L A C M | Ⓛ A C U | Driven by corporate strategy. |
| Alternative Fuels/Fluids | G | 29 | Ⓛ A C M | ⓁA C M | L A C M | L A C M | Ⓛ A C U | CorporateEnvironmental stewardship. |

FIG. 4B

Brand Profiler - Continued

| Attribute | Attribute Class | Priority (Rank) | Primary Brand Positioning | Nameplate Brand Positioning | Program Specifics Target/Objectives | Status | Present Nameplate Entry | Detailed Definition (see last page for a general description of each attribute) |
|---|---|---|---|---|---|---|---|---|
| Special Features | | | | | | | | |
| Innovation | D | 7 | ①A C M | L A③C M | L A C M | L A C M | ①A C U | Functional luxury features consistent with Ford SUV line-up (Rating compared to Suburban only, not with Ford SUV line-up) |
| Luxury | I | 10 | ①A C M | L②C M | L A C M | L A C M | L③C U | Functional luxury features consistent with Ford SUV line-up. |
| Entertainment | I | 14 | L A③C M | L A③M | L A C M | L A C M | ①A C U | Entertainment that enhances premium presence. |
| Other | | | | | | | | |
| Garagability | G | 24 | L A③M | ①A C M | L A C M | L A C M | L③C U | Minimize height without compromising vehicle capability. |
| Corporate Safety Image | G | 26 | L③C M | L③C M | L A C M | L A C M | L③C U | Systems that enhance the safety of other vehicles/passengers (e.g. Blocker-Beam) (With RPA could move to L). |
| Design *84* | I | 12 | ①A C M | L③C M | L A C M | L A C M | L③C U | |
| Sporty | | | | High 10 9 8 7 6 5 ④3 2 1 | Low | | | True to Ford SUV heritage. |
| Youthful | | | | High 10 9 8 7 6 5 4 3 ②1 | Low | | | |
| Expressive | | | | High 10 ⑨8 7 6 5 4 3 2 1 | Low | | | Size, presence. |
| Family | | | | High ⑩9 8 7 6 5 4 3 2 1 | Low | | | Carries all the people and cargo. |
| Conservative | | | | High 10 9 8 ⑦6 5 4 3 2 1 | Low | | | Down-to-earth, safe, predictable. |
| Basic | | | | High 10 9 8 7 6 ⑤4 3 2 1 | Low | | | Form follows function. |
| Substantial | | | | High ⑩9 8 7 6 5 4 3 2 1 | Low | | | Commanding road presence, dependability. |

FIG. 4C

Brand Profiler - Continued

| Attribute | Attribute Class | Priority (Rank) | Primary Brand Positioning | Nameplate Brand Positioning | Program Specifics Target / Objectives | Status | Present Nameplate Entry | Detailed Definition (see last page for a general description of each attribute) |
|---|---|---|---|---|---|---|---|---|
| Design 84 | | | Circle appropriate number for each descriptor | | | 76 | | |
| Tough | | | | | High 10 ⑨ 8 7 6 5 4 3 2 1 Low | | | Ultimate capability, rugged. |
| Prestigious | | | | | High 10 ⑨ 8 7 6 5 4 3 2 1 Low | | | Proud, significant, ultimate Ford SUV. |
| Elegant | | | | | High 10 9 8 7 ⑥ 5 4 3 2 1 Low | | | Limited elegance achieved through interior design. |
| Luxurious | | | | | High 10 9 8 7 ⑥ 5 4 3 2 1 Low | | | Functional luxury not lavish design. |

FIG. 4D

Personal Use Profiler
Definition / Clarification

| Attribute | |
|---|---|
| Usage Experience | |
| Interior Roominess | Includes all aspects of the interior that relate to occupant roominess: front and rear head room, leg room, shoulder room, etc. |
| Ergonomics / Flexibility / Comfort | Thoughtful design, comfort, and ease of use of key touch points (e.g. radio controls, seats, under-hood fluid containers). Devices that increase the flexibility / usability of the vehicle (e.g. tilt steering, additional doors, split-folding rear seats.). |
| Luggage / Cargo Space | Trunk size, interior stowage (i.e. map pockets), payload and cube space (trucks). Also indicate any customer requirements such as shape of cargo space and loading height and width. |
| Durability / Craftsmanship | Durability, craftsmanship, ruggedness, reliability, freedom from breakdown, fit and finish. |
| Quietness | Overall quietness of vehicle including freedom from road, wind, and powertrain noise. |
| Ease of Entry / Exit | Items related to ease of access: size of door opening, step-up height, grab handles, running boards, etc. |
| Range / Fuel Economy | Specify relative importance and label vs. real-life-experience. |
| Climate Control | Heating, air conditioning, ventilation, defrost, and their controls (i.e. separate driver/passenger systems). |

FIG. 5A

| Attribute 62 | Definition / Clarification 82 |
|---|---|
| Usage Experience Cont. | |
| Exterior Visibility | Visibility from inside outward through windows and mirrors. |
| Cost of Ownership | Transaction price, resale value, maintenance costs, repair costs, insurance costs. |
| Driving Experience | |
| Performance / Towing | How the vehicle reacts when the accelerator is pushed. Indicate if customer needs off-the-line acceleration, highway passing or hauling capability (specify towing/payload capacity). |
| Ride | How the vehicle drives over different surface conditions and terrain. |
| Handling | How the vehicle reacts when cornering, vehicle traction, 4x4 operation and ground clearance. |
| Braking | Responsiveness and performance of brakes. |
| Steering | Responsiveness of steering and sensitivity to the road (i.e. does the steering wheel transmit a clear signal to the driver of where they are going). |
| Transmission Performance | Smoothness of shifting, ease of changing from gear to gear. |
| Maneuverability | Ease of turning into tight spaces including turning radius, visibility and ease of steering. |
| Environmental Responsibility | |
| Occupant Safety | Features to negate the consequences of a collision (e.g. airbags) or to prevent a collision (e.g. ABS). |
| Occupant Security | Features that protect the driver and passengers from other people (e.g. remote keyless entry). |
| Vehicle Security | Devices that deter theft and vandalism of the vehicle itself, items inside the vehicle and vehicle parts. |
| Emissions | Greenhouse gases, smog-related, refueling vapors, other vapors, EMC, pass-by-noise. |
| Recyclability | Recyclable material labeling and use, use of post-consumer materials. |
| Alternative Fuels / Fluids | Use of fuel source other than fossil, convenience of re-fueling (access, speed) biodegradable fluids. |
| Special Features | |
| Innovation | Technical innovations to enhance the driving experience (e.g. navigation aids and built-in cellular phones). |
| Luxury | Unique items that add a feeling of luxuriousness and status to the vehicle (i.e. heated seats, woodgrain dash). |

FIG. 5B

| Attribute 62 | 82 | Definition / Clarification |
|---|---|---|
| Special Features Cont. | | |
| Entertainment | | All entertainment related features within the vehicle (i.e. CD player, cassette). |
| Other | | |
| Garagability | | Example - Team defines "Other" attributes. |
| Corporate Safety Image | | Example - Team defines "Other" attributes. |
| Design | | |
| Sporty | | Athletic, muscular, vigorous, powerful, strong, sport association, suggesting movement and dynamism, excitement. Tready stance, road hugging, emphasis on mechanical components and engine compartment size. |
| Youthful | | Active, fresh, spry, vigorous, agile, enthusiastic, lithe, sexy, fun, stylish, charismatic, athletic, lean. |
| Expressive | | Unexpected, inspiring, forceful, distinct, independent, audacious, daring, fearless. Design that commands attention through scale, color, uniqueness, proportions, texture and graphics. Have dominant theme throughout. |
| Family | | Roomy, spacious, easy to use, safe/secure, non-aggressive, quiet, understated, universal. Relatively large passenger and cargo areas, functional and safe looking design elements. |
| Conservative | | Traditional, reasonable, evolutionary, cautious, preserving the essence, down-to-earth, safe, predictable. Slight modifications to design elements seen before. |
| Basic | | Simple, sound, clear, uncluttered, pure, clean, unspoiled, geometric, machined, affordable, brutal, Bauhaus, form follows function. Displaying uncomplicated geometric forms, graphics and textures. |
| Substantial | | Robust, bold, heavy, long-lasting, durable, functional, enduring, sturdy. Low visual center of gravity, large stable mass, positive powerful sections. |
| Tough | | Solid, strong, firm, rugged, hard, vigorous, sturdy, durable, purposeful/attitude. |
| Prestigious | | Significant, famous, proud, dignified, reputable. Prestige earned through looks, technical achievement, tradition. Emulate design elements that have achieved the status of prestige on other cars or products. |
| Elegant | | Flowing lines, subtle, shaped, sculpted, beautiful, pleasing, sensual, sophisticated. Incorporating elements of expensive and upscale automobiles, also expressed in materials, proportions, graphics. |
| Luxurious | | Rich, sumptuous, comfortable, extravagant, opulent, lavish, detailed, precious materials, individual, crafted, handmade, custom built, highest levels of creature comfort. |

FIG. 5C

90 Brand Profiler - Continued

| Attribute | Attribute Class | Priority (Rank) | Primary Brand Positioning | Nameplate Brand Positioning | Program Specifics | | Present Nameplate Entry | Detailed Definition (see last page for a general description of each attribute) |
|---|---|---|---|---|---|---|---|---|
| | | | | | Target / Objectives | Status | | |
| Usage Experience - Cab | | | L A C M | L A C M | L A C M | L A C M | L A C U | |
| Interior Roominess | | | L A C M | L A C M | L A C M | L A C M | L A C U | |
| Climate Control | | | L A C M | L A C M | L A C M | L A C M | L A C U | |
| Ergonomics / Flexibility / Comfort | | | L A C M | L A C M | L A C M | L A C M | L A C U | |
| Ease of Entry / Exit | | | L A C M | L A C M | L A C M | L A C M | L A C U | |
| Exterior Visibility | | | L A C M | L A C M | L A C M | L A C M | L A C U | |
| Stowage | | | L A C M | L A C M | L A C M | L A C M | L A C U | |
| Usage Experience - Load Box | | | | | | | | |
| Length | | | L A C M | L A C M | L A C M | L A C M | L A C U | |
| Width | | | L A C M | L A C M | L A C M | L A C M | L A C U | |
| Cube / Height | | | L A C M | L A C M | L A C M | L A C M | L A C U | |
| Payload | | | L A C M | L A C M | L A C M | L A C M | L A C U | |
| Access | | | L A C M | L A C M | L A C M | L A C M | L A C U | |
| Ergonomics / Flexibility / Comfort | | | L A C M | L A C M | L A C M | L A C M | L A C U | |
| Ease of Modification | | | L A C M | | L A C M | L A C M | L A C U | |
| Usage Experience - Total Vehicle | | | | | | | | |
| Cost of Ownership | | | L A C M | L A C M | L A C M | L A C M | L A C U | |

FIG.6A

Brand Profiler - Continued

90 →

| Attribute | Attribute Class | Priority (Rank) | Primary Brand Positioning | Nameplate Brand Positioning | Program Specifics Target / Objectives | Program Specifics Status | Present Nameplate Entry | Detailed Definition (see last page for a general description of each attribute) |
|---|---|---|---|---|---|---|---|---|
| Usage Experience - Total Vehicle Continued | | | | | | | | |
| Craftsmanship | | | L A C M | L A C M | L A C M | L A C M | L A C U | |
| Durability | | | L A C M | L A C M | L A C M | L A C M | L A C U | |
| Fuel Economy / Range | | | L A C M | L A C M | L A C M | L A C M | L A C U | |
| Quietness | | | L A C M | L A C M | L A C M | L A C M | L A C U | |
| Serviceability | | | L A C M | L A C M | L A C M | L A C M | L A C U | |
| Driving Experience | | | | | | | | |
| Performance / Responsiveness | | | L A C M | L A C M | L A C M | L A C M | L A C U | |
| Handling | | | L A C M | L A C M | L A C M | L A C M | L A C U | |
| Maneuverability | | | L A C M | L A C M | L A C M | L A C M | L A C U | |
| Braking | | | L A C M | L A C M | L A C M | L A C M | L A C U | |
| Ride | | | L A C M | L A C M | L A C M | L A C M | L A C U | |
| Steering | | | L A C M | L A C M | L A C M | L A C M | L A C U | |
| Transmission Performance | | | L A C M | L A C M | L A C M | L A C M | L A C U | |
| Environmental Responsibility | | | | | | | | |
| Occupant Safety & Security | | | L A C M | L A C M | L A C M | L A C M | L A C U | |
| Content Security | | | L A C M | L A C M | L A C M | L A C M | L A C U | |
| Vehicle Security | | | L A C M | L A C M | L A C M | L A C M | L A C U | |

FIG. 6B

Brand Profiler - Continued

90 ⌐

| Attribute | Attribute Class | Priority (Rank) | Primary Brand Positioning | Nameplate Brand Positioning | Program Specifics - Target / Objectives | Program Specifics - Status | Present Nameplate Entry | Detailed Definition (see last page for a general description of each attribute) |
|---|---|---|---|---|---|---|---|---|
| Environmental Responsibility Continued | | | | | | | | |
| Emissions | | | L A C M | L A C M | L A C M | L A C M | L A C U | |
| Recyclability | | | L A C M | L A C M | L A C M | L A C M | L A C U | |
| Alternative Fuels / Fluids | | | L A C M | L A C M | L A C M | L A C M | L A C U | |
| Special Features | | | L A C M | L A C M | L A C M | L A C M | L A C U | |
| Entertainment / Luxury | | | L A C M | L A C M | L A C M | L A C M | L A C U | |
| Innovation | | | L A C M | L A C M | L A C M | L A C M | L A C U | |
| Other | | | L A C M | L A C M | L A C M | L A C M | L A C U | |
| | | | L A C M | L A C M | L A C M | L A C M | L A C U | |
| Design | | | Circle appropriate number for each descriptor | | | | | |
| Expressive | | | | High 10 9 8 7 6 5 4 3 2 1 Low | | | | |
| Conservative | | | | High 10 9 8 7 6 5 4 3 2 1 Low | | | | |
| Basic | | | | High 10 9 8 7 6 5 4 3 2 1 Low | | | | |
| Substantial | | | | High 10 9 8 7 6 5 4 3 2 1 Low | | | | |
| Tough | | | | High 10 9 8 7 6 5 4 3 2 1 Low | | | | |
| Prestigious | | | | High 10 9 8 7 6 5 4 3 2 1 Low | | | | |
| Functional | | | | High 10 9 8 7 6 5 4 3 2 1 Low | | | | |

FIG. 6C

Commercial Vehicle Profiler

| Attribute | Definition / Clarification |
|---|---|
| Usage Experience - Cab | |
| Interior Roominess | Includes all aspects of the interior that relate to occupant roominess: front and rear head room, leg room, shoulder room, etc. |
| Climate Control | Heating, air conditioning, ventilation, defrost and their controls. |
| Ergonomics / Flexibility / Comfort | Thoughtful design, comfort and ease of use of key touch points (e.g. radio controls, seats). Devices that increase the flexibility/usability of the vehicle (e.g. tilt steering). |
| Ease Of Entry / Exit | Self defining. |
| Exterior Visibility | Self defining. |
| Stowage | Storage places in the cab for non-cargo items (i.e. map pockets and glove boxes). |
| Usage Experience - Load Box | |
| Length | Self defining. |
| Width | Self defining. |
| Cube / Height | Self defining. |
| Payload | Self defining. |
| Access | Ability to access cargo; includes such characteristics as floor height, door opening size and configuration of load box. |
| Ergonomics / Flexibility / Comfort | Thoughtful design, comfort and ease of use of key touch points such as control levers and tie-down straps. For people-carrying vehicles this includes the comfort and flexibility of the passenger areas. |
| Ease of Modification | Ability of aftermarket companies to add parts, increase functionality, or modify the vehicle to suit different customer needs. |
| Usage Experience - Total Vehicle | |
| Cost of Ownership | Transaction price, resale value, maintenance costs, repair costs, insurance costs. |
| Craftsmanship | Build, fit and finish. |
| Durability | Ruggedness, reliability, freedom from breakdown. |

FIG. 7A

| Attribute | 92 Definition / Clarification |
|---|---|
| Usage Experience - Total Vehicle Continued | |
| Fuel Economy / Range | Self defining. |
| Quietness | Overall quietness of vehicle including freedom from road, wind, and powertrain noise. |
| Serviceability | Speed of, frequency of, and ease of repair and the ability to find adequate repair facilities. |
| Driving Experience | |
| Performance / Responsiveness | How the vehicle reacts when the accelerator is pushed. Indicate if customer needs off-the-line acceleration, highway passing or hauling capability (specify towing/payload capacity). |
| Handling | How the vehicle reacts when cornering, vehicle traction, 4x4 operation and ground clearance. |
| Maneuverability | Ease of turning into tight spaces including turning radius, visibility and ease of steering. |
| Braking | Responsiveness and performance of brakes. |
| Ride | How the vehicle drives over different surface conditions and terrain. |
| Steering | Responsiveness of steering and sensitivity to the road (i.e. does the steering wheel transmit a clear signal to the driver of where they are going). |
| Transmission Performance | Smoothness of shifting, ease of changing from gear to gear. |
| Environmental Responsibility | |
| Occupant Safety & Security | Features to negate the consequences of a collision (e.g. airbags) or to prevent a collision (e.g. ABS) and those that protect the driver and passengers from thieves (e.g. remote keyless entry). |
| Contents Security | Those devices that protect the cargo of the vehicle from theft or damage. |
| Vehicle Security | Devices that deter theft and vandalism of the vehicle itself, items inside the vehicle, and vehicle parts. |
| Emissions | Greenhouse gases, smog-related, refueling vapors, other vapors, EMC, pass-by-noise. |
| Recyclability | Recycle material labeling and use, use of post-consumer materials. |
| Alternative Fuels / Fluids | Use of fuel source other than fossil, convenience of re-fueling (access, speed) biodegradable fluids. |

FIG. 7B

| Attributes | | Definition / Clarification |
|---|---|---|
| Special Features | | |
| | Entertainment / Luxury | Unique items that provide entertainment or add a feeling of luxuriousness and status to the vehicle (i.e. heated seats, woodgrain dash). |
| | Innovation | Technical innovations to enhance the operating experience (e.g. navigation aids and built-in cellular phones). |
| | Other | Self defining. |
| | | Self defining. |
| Design | | |
| | Expressive | Unexpected, inspiring, forceful, distinct, independent, audacious, daring, fearless. Design that commands attention through scale, color, uniqueness, proportions, texture and graphics. Have dominant theme throughout. Audi TT, Dodge Viper, Jaguar XJS. |
| | Conservative | Traditional, reasonable, evolutionary, cautious, preserving the essence, down-to-earth, safe, predictable. Slight modifications to design elements seen before.GM J Car, Toyota Corolla, VW Jetta. |
| | Basic | Simple, sound, clear, uncluttered, pure, clean, unspoiled, geometric, machined, affordable, brutal, Bauhaus, form follows function. Displaying uncomplicated geometric forms graphics and textures. Citroen 2CV, Fiat Panda, Jeep, VW Concept. |
| | Substantial | Robust, bold, heavy, long-lasting, durable, functional, enduring, sturdy. Low visual center of gravity, large stable mass, positive powerful sections. Audi Range, A4, Lexus GS300, DEW98, Explorer. |
| | Tough | Solid, strong, firm, rugged, hard, vigorous, sturdy, durable, purposeful/attitude. F-Series. |
| | Prestigious | Significant, famous, proud, dignified, reputable. Prestige earned though looks, technical achievement, tradition. Emulate design elements that have achieved the status of prestige on other cars or products. Town Car, Cadillac, Rolls Royce. |
| | Functional | Purposeful, form follows function, style is a statement of function of the vehicle, expressed in materials, proportions, graphics. |

FIG.7C

METHOD OF PROFILING NEW VEHICLES AND IMPROVEMENTS

BACKGROUND

The present invention relates generally to product development, and more particularly, to a method of positioning a brand and profiling product attributes for an intended customer market. More specifically, the method concerns brand positioning and product profiling methods for personal and/or commercial use vehicles.

The primary goal of any durable goods manufacturer is to produce a product that is in demand by consumers. The purchasing decision of consumers, on the other hand, is influenced by many factors. These factors include: product cost, quality, convenience, design, safety, and prior brand or product experience, among other things. The marketing division of durable goods manufacturers are generally concerned with identifying product attributes and correlating them to consumer segments. Many organizations, however, lack an organized systematic method of positioning a brand or a product to meet identifiable attribute targets or objectives which are customer driven. It is, therefore, desirable to develop a marketing strategy which profiles brands or products according to identifiable customer-driven attributes. In this way, products or brands may be more closely correlated to customer expectations or desires than with previously known marketing processes.

SUMMARY OF THE INVENTION

It is, therefore, one object of the present invention to provide an improved marketing strategy which incorporates a specific brand or product profile. It is a further object of the present invention to incorporate customer input into the brand or product profile.

One advantage of the present method is that it provides customer-driven products with consistent brand images and identifiable product attributes.

According to the present invention, the foregoing and other objects and advantages are attained by a method of developing product characteristics for a new automotive vehicle comprising the steps of: generating a plurality of vehicle attributes including usage experience attributes, driving experience attributes, and design attributes; classifying each of the attributes; generating a preferred vehicle brand position as a function of the vehicle attributes; and, generating target vehicle characteristics as a function of the vehicle attributes and the preferred vehicle brand position. In this manner, the target vehicle characteristics represent customer-driven objectives for each of the plurality of vehicle attributes.

Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings:

FIG. 2 is an example of a vehicle brand positioning summary.

FIGS. 4A through 4D are examples of a brand profiler form for use with one embodiment of the present invention.

FIGS. 5A through 5C are sample definitions supporting the brand profiler form of FIGS. 4A through 4D.

FIGS. 6A through 6C is a further example of a brand profiler form for use with one embodiment of the present invention.

FIGS. 7A through 7C are sample definitions supporting the board profiler form of FIGS. 6A through 6C.

DESCRIPTION OF THE PREFERRED EMBODIMENT(S)

With reference to the following Figures, a method of profiling a brand or a product for automotive vehicles is described. It is to be understood, however, that the present brand/product profiling method is equally applicable to marketing strategies for any durable good.

Figure 1:
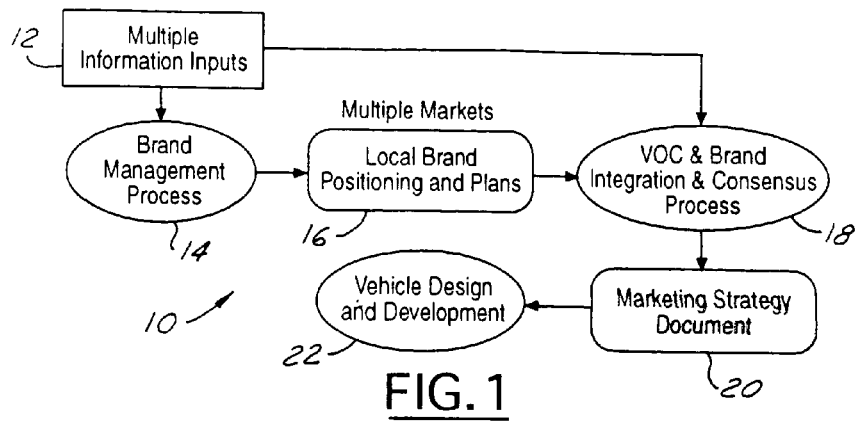
FIG. 1 is a flow chart of an example of a market inquiry process.

Referring now to FIG. 1, a market inquiry process 10 is generally shown. In the market inquiry process 10, various multiple information inputs 12 are used to provide various information to the market inquiry process 10. Multiple information inputs may, for example, be collected by various local marketing groups located in the countries or regions of the country that the vehicle may be marketed. Examples of information include current styles and trends of the group to which the product will be marketed. Multiple information inputs 12 is used as inputs to a brand management process 14.

Brand management process 14 includes identifying a brand through which the product will be marketed. A brand may, for example, be an existing nameplate used by a manufacturer. Brand management includes the process of inquiring as to whether the particular product will satisfy the needs and/or wants of the particular brand that the product falls within.

After the various brand considerations are developed in the multiple markets through which the product will be marketed in step 16, block 18 includes the steps of forming a consensus with respect to brand integration from the various multiple markets and refines the goal for the new product. Block 18 may also be directly input from multiple information inputs 12 as well. These multiple information inputs may be different in time from those acquired in the brand management process 14. In block 18, a voice of the customer (VOC) process is implemented for evaluating the multiple information inputs according to what is perceived as desired wants and needs of customers of the particular brand.

In block 20, a marketing strategy document is developed using the various inputs from the previously described steps. The development and content of the marketing strategy document will be further described below.

The marketing strategy document 20 is used in block 22 in the vehicle design and development process. Thus, the vehicle design and development process may be influenced by the marketing strategy document 20. By providing information to the vehicle design and development process 22, items such as design, package standard features, optional features, color, trim, and pricing may all be used to influence the vehicle design. Because this process is implemented early, and it is updated during the development process, changes are less expensive to implement.

Referring now to FIG. 2, a product brand positioning summary 30 is included as part of the marketing strategy documentation. This summary 30 is information about the vehicle with respect to the particular market to which it will be marketed. It can relate either to an entirely new vehicle, or carryover vehicle brand positioning information can be used. The brand positioning 30 is an executive level document created very early in the product development life cycle. Because it incorporates customer and brand information resulting from the market inquiry process 10, it is used to drive the brand profiler as detailed below.

The brand positioning summary 30 includes several distinct fields which define a brand or product under consideration. For example, field 32 identifies the target customer defining characteristics. For this particular product under consideration, these characteristics include: a strong desire to experience the "real" outdoors, being highly motivated and driven for success, and, a need to escape from the stress/pressure of weekdays to family-oriented weekend activities in the great outdoors. Such defining characteristics are derived from the voice of the customer and brand integration process identified in steps 12–18 of FIG. 1. The customer defining characteristics 32 are related to a rationale for selecting the target customer as shown in field 34. The selection rationale for such customers include: aspirational targets, a high interest in truck capabilities, strong interests in sport utility vehicles (SUV), and, consider the vehicle as a way of rewarding themselves.

The product under consideration is then positioned with respect to its role in the brand or corporate portfolio of products. This summary is shown in field 36. For example, the product under consideration is to be the "rugged adventure" leader of the Ford SUV lineup. The vehicle is also to support the Ford Division core SUV attributes of confidence, ruggedness, refined looks, and versatility. It also reinforces the Ford truck heritage of "built Ford tough" and contributes to the Ford Division positioning as the industry leader providing the broadest SUV lineup.

The product role in the portfolio 36 is then contrasted against a competitive assessment field 38 which identifies competitive products and corresponding attributes. By summarizing the competitive products and attributes in this field, the brand positioning attributes of the product under development can be readily identified as competitive or uncompetitive.

Some of the reasons why the target customer might buy the product under consideration are summarized in field 40. For example, the target customer might buy the product under development because of its capability to master any environment in that it balances off road capability, ride, comfort, and maneuverability. Another reason may be the product's superior comfort through innovative interior versatility, ergonomics, and advanced technology. The rugged styling, which provides a statement of the customer's success and adventurous lifestyle may also have an enduring influence on the customer's purchase decision. Another reason a target customer may purchase the product is that it is environmentally responsible in that it has the lowest emissions and highest recyclability of any competing product.

Finally, field 42 summarizes the pricing considerations for the product brand under consideration. In this case, the pricing considerations to be taken into account include: the price of other Ford Division products, the price of competitive products, and the premium brand image which is desired for the product.

The format of the brand positioning summary 30 is important because it succinctly summarizes key customer and product attributes. To provide maximum benefit, the format of the brand positioning summary 30 should remain constant from product to product with only the content changing. Thus, for example, if a new sports car were being developed, the six categories would remain the same. The content of each category, obviously, would be very different, however.

Figure 3:
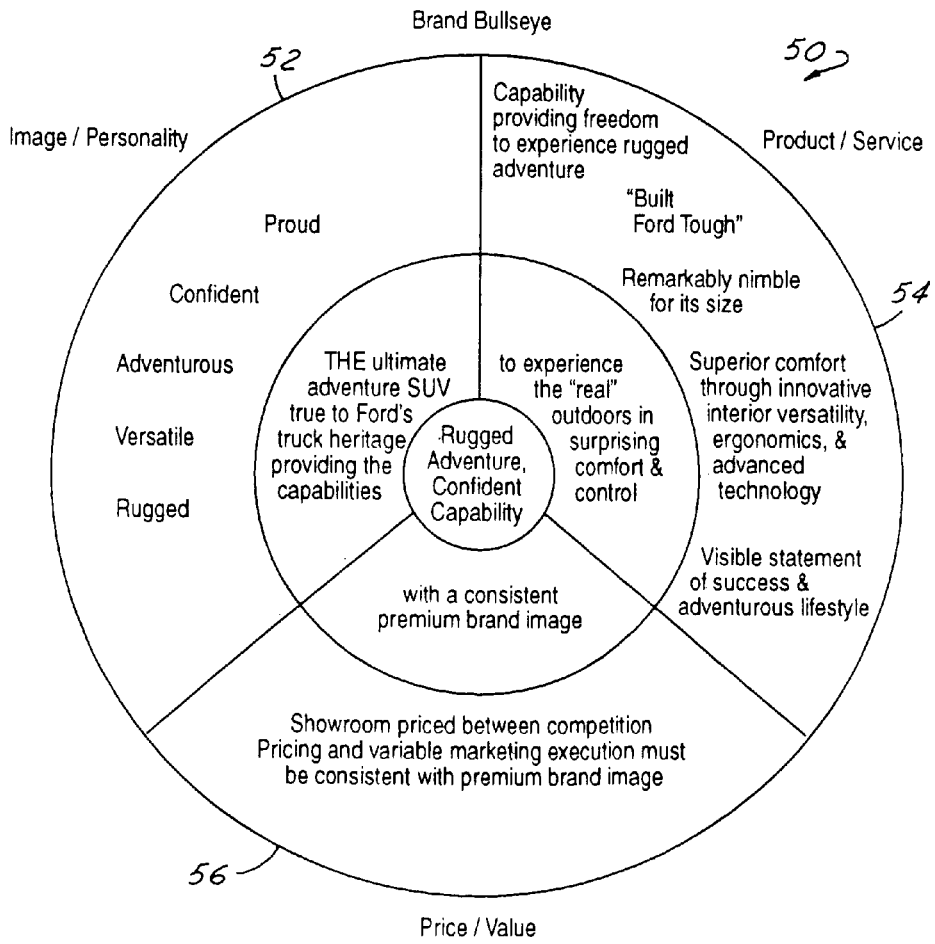
FIG. 3 is an example of a vehicle brand bullseye chart for the brand summary of FIG. 2.

Closely related to the brand position summary 30 is the brand bullseye 50 shown in FIG. 3. The brand bullseye 50 visually organizes the brand positioning summary 30 of FIG. 2 to provide the core brand image or attributes common to the three areas of image/personality 52, product/service 54, and price/value 56. In this case, the core brand attributes are "rugged adventure" and "confident capability."

The brand bullseye 50 is similar to the brand positioning summary 30 in that it identifies similar product 54 and purchase information 56 but omits much of the customer characteristics (32, 34 of FIG. 2). Instead, the brand bullseye 50 provides additional "color" to the new product by identifying attributes relating to its image or personality 52.

Because the brand bullseye 50 is an executive summary document like the brand positioning summary 30, and the two are strongly related, they are preferably created at the same time in the product development life cycle. These documents are created once the following steps have occurred: a brand management team has been formed; brand analysis has been conducted; target customer selection, description and needs have been identified; brand benefits have been identified; and a brand personality has been created. The goal of including target customer information is to succinctly describe the intended customer group such that the product team can visualize this audience. The brand team must understand the customer's deep-seeded needs and articulate these needs better than the customer. Similarly, the brand personality condenses the personality intangibles into a few words (2 to 3) that capture the emotional side of the brand's connection to the customer. In addition, price considerations appear on the brand positioning summary 30 and brand bullseye 50. Pricing considerations identify the net transaction price range, and state the price position relative to the key competition. This is stated as either higher, lower, or on parity with the competition. Once these steps have been completed, the brand positioning summary 30 and brand bullseye 50 are created to link the foregoing information in a way that clearly and simply articulates what the brand is all about.

FIGS. 4A through 4D show an example of a brand profile for a personal use vehicle. The brand profiler 60 includes several columns of information to be identified, ranked, and targeted as an objective for the product under consideration. The form itself is used to drive the VOC process and brand integration process into the new product.

The first column of the brand profiler 60 identifies the product attributes 62. Each attribute 62 is an identifiable feature of the generic product under consideration which in this case is an automotive vehicle for personal use. These attributes do not change. Thus, all new personal use vehicle brand profiles will have the same attribute list. The attributes are grouped according to the potential vehicle usage, the driving experience, environmental impact, including the occupant environment, vehicle design, special attributes for this particular vehicle, and other goals identified by customer-oriented market research which may be important attributes for the vehicle under consideration. Of course, if the product under development were something other than a personal use vehicle—a washing machine, for example—the attributes would be different.

In this example, vehicle usage attributes include: interior roominess, ergonomics/flexibility/comfort, luggage/cargo space, durability/craftsmanship, quietness, ease of entry/exit, range/fuel economy, climate control, exterior visibility, and cost of ownership.

Driving experience includes such-things as: performance/towing, ride, handling, braking, steering, transmission performance, and maneuverability.

Environmental attributes for personal use vehicles include: occupant safety, occupant security, emissions, recyclability, and the use of alternate fuels/fluids.

Special features or other important attributes for, in this case, a SUV may include: the level of innovation, luxury considerations, entertainment, the ability to fit the vehicle in a typical garage, and the vehicle's ability to support the corporate safety image.

The design attributes (FIG. 4C) of the vehicle are summarized as a series of descriptive adjectives: sporty, youthful, expressive, family, conservative, basic, substantial, tough, prestigious, elegant, and luxurious.

Each of the attributes 62 is placed in an attribute class 64 and given a priority or rank 66. These columns 64, 66 are initially blank and are filled in as part of the product development process described below. FIG. 4A shows the columns 64, 66 as they would appear for a completed brand profiler 60.

The attribute classes 64 comprise three groupings: D, I, and G. Group D represents a brand or product "differentiator." These are attributes which are considered extremely important to differentiate the brand from competitive brands or products. In other words, it is the basis on which the brand's personality is built. Group I are considered "important" brand benefits. These are attributes which are considered an important part of the brand's personality but which do not necessarily differentiate the product from competitive products. Group G are attributes which are considered "given" or necessary for the product under consideration. These are attributes whose priorities are determined by the cost of entry. In other words, within the cost constraints for the proposed product, these attributes will be included and/or maximized. These attributes, however, are improvements which are not considered critical to support the brand's personality. A fourth attribute class may also be included as NA, which means that the attribute is "not applicable" to this brand or vehicle type.

The next column in the brand profiler 60 of FIG. 4A is the priority or rank 66. A priority 66 typically correlates to the attribute class 64 and further prioritizes each attribute 62. Thus, as can be seen in FIG. 4A for a completed brand profiler 60, attributes which are considered brand "differentiators" are given a higher priority than "important" attributes which, in turn, are given a higher priority than "given" attributes. In this example, "interior roominess" is the attribute assigned the highest priority, whereas the vehicle's use of "alternative fuels or fluids" is given the lowest priority. Note that these priority rankings 66 and attribute classes 64 strongly correlate to the brand positioning summary 30 (FIG. 2) and brand bullseye 50 (FIG. 3). As mentioned above, this is due to the fact that the brand positioning summary 30 and brand bullseye 50 drive the development of the profiler 60.

The next two columns on the brand profiler 60 are the primary brand positioning column 68 and the nameplate brand positioning column 70. In both of these columns, 68 and 70, the designators L, A, C, and M are used to relate the attribute 62 under consideration to the desired brand position 68, or product position 70. The primary brand positioning in column 68 represents, for example, "Ford," "Mercury" or "Lincoln"; whereas the nameplate brand positioning column 70 represents a specific product within that brand, such as the "Ford Expedition" or "Ford Explorer".

The primary brand positioning 68 is consistent for the given brand (i.e., Ford) and, therefore, the appropriate designators (i.e., L, A, C, M) are circled by the marketing personnel responsible for brand management. In contrast, the nameplate brand positioning 70, like the attribute class 64 and priority/rank 66, is completed as part of the brand profiling process described below. Throughout the brand profiler 60, the designator L represents leadership. These are attributes that should set the brand apart from other vehicles within the competitive set. These attributes represent the basis on which the brand's personality is built. Typically, such attributes would also be grouped as differentiators within the attribute class 64 and be considered attributes with high priority 66. Preferably, leadership attributes for the product under development would be considered approximate 10 percent improvements over the competitive set. Thus, for example, if the attribute 62 "interior roominess" was designated as a leadership attribute, it should have approximately 10 percent more interior roominess than the competitive set.

The competitive set is comprised of competitor products that are used as current and future benchmarks against the vehicle under development. Various characteristics of a vehicle are chosen when determining a competitive set. Vehicles having "best in class" features for the attribute under consideration are typically chosen.

The designator A within the brand profiler 60 represents an attribute which must be "among the leaders" in the competitive set. These are attributes in which the brand must be as good as the best in the competitive set to support its positioning. These attributes may be considered as required to score in the top 25 percent of the competitive set.

Designator C in the brand profiler 60 represents "competitive" attributes. These are attributes in which the brand must be in line with the competitive set, but they are not considered critical to support the brand's personality. These are attributes which may be considered to rank in the top 25th to 75th percentile among the competitive set.

Designator M represents attributes to be given "minimal investment." These attributes are not considered relevant to supporting the brand and, if required at all, they should be met at the lowest possible cost.

The primary brand positioning column 58 and nameplate brand positioning column 70 represent ideal goals for the brand positioning of the product under development. Thus, for example, they represent the "Ford" primary brand and "Expedition" nameplate ideals, respectively, independent of constraints such as investment and engineering hurdles, and market changes such as new competitors or regulatory actions. They are customer-driven and strongly relate to the brand positioning summary 30 and brand bullseye 50. These columns are then related to the program specifics column 72, which is subdivided into a target/objectives column 74 and a status column 76.

Both the target/objectives column 74 and status column 76 include the L, A, C, M designators discussed above with respect to the brand positioning column 68, 70. Again, like the nameplate brand positioning column 68, the columns 74, 76 are completed as part of the brand profiling process.

The target/objectives column 74 represents tradeoffs necessary to achieve the desired nameplate brand positioning 70 for the current product under development. Thus, for example, the nameplate brand positioning may represent the ideal "Ford Expedition" SUV, but the target/objective 74 will represent only the "Ford Expedition" for model year 2001. The target/objective column 74 may or may not have the same descriptors (i.e. L, A, C, M) circled for each attribute as the nameplate brand positioning column 68 due to cost, time, or technology constraints. The process of identifying the target/objectives designator for each attribute 62 will be discussed in further detail below with reference to the brand profiling process. The status column 76 represents the progress made towards achieving the target/objective for each attribute 62 during the product development cycle.

The present nameplate entry column 78 represents the attribute positioning for the existing product which the product under development is improving upon or replacing. Again, one designator selected from the set of L, A, C, U, is chosen for each attribute 62 and circled. Preferably, these entries are data driven as much as possible. In this case, the designator U represents an "uncompetitive" attribute. It is analogous to the designator M (minimal investment) identified in the preceding columns 68–76 for the product under development. Since the present nameplate entry is already in existence, the designator U more accurately describes the attribute as uncompetitive, whereas for the product under development, the designator M more accurately represents attributes where few resources should be committed.

Alternatively, if no current brand exists, a target competitor can be recorded and profiled in the present nameplate column 78.

The last column of the brand profiler 60 is the detailed definition column 80. This column 80 provides a summary description of each attribute 62 to place the attribute 62 in a more proper context for the product under consideration. The detailed definition provides "texture" or "color" for the specific attribute. For example, for the driving experience attribute of "ride," the definition "a smooth ride on all surfaces and in all conditions" provides additional guidance to the product development team with respect to this attribute. For a truck or a passenger vehicle, this definition gives meaning to the attribute "ride." In contrast—for a sports car—"ride" may be defined as "maximum responsiveness and driver feedback on all surfaces." The detailed definitions are developed as part of the brand profiling process which will be described in further detail below.

FIGS. 5A through 5C are part of the brand profiler 60 and complement the detailed definition column 80 for each attribute 62. As can be seen, a definition or clarification 82 for each attribute 62 is provided. These definitions 82 differ from the detailed definitions 80 in that they do not change for each product or brand under development, whereas the detailed definitions 80 may be modified for each new product. For instance, using the driving experience attribute of "ride," (FIG. 5B) the definition 82 provides "how the vehicle drives over different surface conditions and terrain." As noted above, in contrast, the detailed definition 80 for the same attribute required "a smooth ride on all surfaces and in all conditions." Thus, the definition/clarification column 82 merely provides guidance in developing a detailed definition 80 for each attribute 62. Like the attributes 62, the detailed definitions 80 are provided as part of the brand profiler form 60.

Referring again to FIGS. 4C and 4D, a significant aspect of the brand profiler 60 is that the design attributes 84 are prioritized differently from the remaining attributes 62. As mentioned above, the design attributes comprise a group of styling descriptors. These include sporty, youthful, expressive, family, conservative, basic, substantial, tough, prestigious, elegant, and luxurious. Because design plays such an important role in durable goods purchases, and automotive vehicles in particular, the design attributes are treated differently from, and provided with additional gradients of design image, than the remaining vehicle attributes.

In this example, each of the design descriptors 84 is given a priority value from low (1) to high (10). It follows in this case that the design descriptors 84 of "family" and "substantial" are given high priority since the attributes 62 of "interior roominess" and "luggage/cargo space" are given high priority and classified as an attribute differentiator for this particular vehicle. Similar to the other attributes, however, the design descriptors are provided with a detailed definition 80 to help place the descriptor and its corresponding priority in context for the particular vehicle under development. These definitions 80 give life to the design descriptors 84 to help focus the designers on the desired attribute.

Referring again to FIG. 5C, each of the design descriptors 84 is also given a definition/clarification in the definition column 82. Thus, the definition/clarification for the design descriptor "family" reads "roomy, spacious, easy to use, safe/secure, non-aggressive, quiet, understated, universal. Relatively large passenger and cargo areas, functional and safe looking design elements." Examples of existing products considered to fit this definition/clarification may also be included in the definitions column 82. Examples for the design descriptor "family" may include such vehicles as the Ford Windstar or Mercury Villager minivans.

FIGS. 6A–6C and 7A–7C show other examples of a brand profiler 90 and corresponding definition and clarification table 92 for a commercial vehicle. The brand profiler for the commercial vehicle 90 is similar to that of the brand profiler 60 for a personal use vehicle with the exception that it emphasizes attributes considered important by the commercial enterprise owner, such as size, payload, and cost of ownership. Similarly, the design descriptors for the commercial vehicle brand profiler 90 differ from those of the personal use vehicle brand profiler 60 with particular emphasis on the work-like, functional nature of commercial vehicles.

The function of the brand profilers 60, 90 is to drive customer needs, wants, and desires into the engineering and development process of a new vehicle. Brand profiler 60, 90 aligns the primary and nameplate brand and key market customer requirements to the product development planning process. Preferably, the brand profiler 60, 90 is updated at relevant times in the product development life cycle. For example, an initial brand profiler may be developed at product kickoff when key markets and associated brand positionings 30 are identified. In addition, a brand profiler 60, 90 is preferably developed for each key market in which the product is intended to be sold. As further market research is conducted and information gathered with respect to the potential new product, the brand profiler 60, 90 may then be updated as necessary to reflect the latest data since the initial brand profiler was created. Such data may include updated consumer needs, concept/implementation-ready technology trends, corporate and regulatory must and wants, competitive set scenario models, competitor strategic reviews, vehicle alternatives, alternative components, program assumptions, and quality information. By updating the brand profiler 60, 90, the intent is to align consumer dominant needs to the product development by reviewing and agreeing upon the initial brand profiler and prioritizing vehicle attributes and design images.

The use of the brand profiler 60 to achieve customer driven product development, i.e., the brand profiling process, will now be described with reference to FIG. 4A. The brand profiler 60 is a tool used to expand the nameplate brand positioning summary 30. This tool enables marketing personnel to articulate, specifically and consistently to the product development team, the profile of product attributes required to support the nameplate brand positioning and to reconcile this within time, budget and regulatory constraints. The brand profiler 60 is specially designed to act as the focus for a conversation among a cross-functional product team (CFPT) as is described below. The first iteration of the profiler represents the ideal product attribute configuration to support the brand positioning in the market place. The brand profiler 60 will then highlight any movement away from the ideal positioning which occurs as part of the trade-off process during the program. This tool provides a process check to ensure that the brand positioning can be supported by the program.

The use of the brand profiler 60 is driven by the brand positioning summary 30 and brand bullseye 50 which are developed earlier in the product development cycle. The brand positioning summary 30 and brand bullseye 50 are high level documents created very early in the product development cycle as an executive summary of key customer and brand attributes for the new product. Given the brand positioning summary 30 and brand bullseye 50, the primary brand positioning column 68 of the brand profiler 60 is completed by the marketing division responsible for brand development within the organization. In other words, the brand profiler 60 initially comprises only the attributes 62 and a corresponding primary brand positioning designator such as L, A, C, or M. If a present nameplate entry exists for the new product, the present nameplate entry column 78 is also completed by circling an appropriate attribute designator.

Using the brand bullseye 50 and brand positioning summary 30 as product development catalysts, a cross-functional product team (CFPT) completes the attribute class column 64, priority column 66, nameplate brand positioning column 70, target/objectives column 74, the status column 76, and the detailed definition column 80. The cross-functional product team preferably consists of at least one member from each of vehicle program management, marketing, purchasing, finance, engineering, and design. For example, a CFPT may include the engineering manager, product manager, a design representative, purchasing personnel, a finance representative, and marketing personnel. Marketing personnel would preferably include employees responsible for marketing plans, brand development, advertising, and market research.

The profiling process is completed by making trade-offs in terms of prioritizing each attribute to meet the customer needs/wants/desires within time, technology, and budgetary constraints, and government regulations. The process of achieving agreement on the target/objectives column 74 is an important part of the brand profiler process. These targets/objectives, which are based on customer needs and wants, drive the program product decisions. To achieve agreement, it is helpful that key decision makers from each of the groups identified in the CFPT participate. These participants should be well-prepared and have a detailed understanding of the band positioning summary 30, brand bullseye 50 and target customer.

Starting with the attribute class 64, the CFPT must delineate these unique, enduring qualities that will set the brand apart from the competition (differentiators) and those attributes required to compete within the product segment (givens). The class column 64 aids the CFPT in completing the priority ranking 66.

Assuming the primary brand and ideal nameplate brand columns 68, 70 are completed, the CFPT agrees on target/objectives based on the positioning of the current product entry 78 and the hurdles which must be overcome to achieve the ideal nameplate brand 70. The detailed definition column 80 is used to capture the interpretation of the attribute in customer terms. Most customers want their vehicles to handle well, but the interpretation is different for a large luxury vehice and a small sports car. Once the brand profiler has been completed, it is used to give the product development team direction and drives the development of the engineering specifications for the new product.

While the invention has been described in connection with one or more embodiments, it is to be understood that the specific mechanisms and techniques which have been described are merely illustrative of the principles of the invention. Numerous modifications may be made to the methods described without departing from the spirit and scope of the invention as defined by the appended claims.

What is claimed is:

1. A method of developing a brand profile for a new product comprising the steps of:

providing a predetermined plurality of product attributes each representing an identifiable feature of a generic product under consideration;

grouping said product attributes in response to customer-oriented market research;

placing each of said attributes in an attribute class corresponding to brand personality importance;

thereafter, generating a preferred product brand position as a function of said product attributes via a processor, including identifying a competitive set of products, and associating each of said product attributes with a preferred competitive level with respect to said competitive set; and generating target product characteristics as a function of said classified product attributes and said preferred product brand position via said processor, said target product characteristics representing customer-driven objectives for each of said plurality of product attributes to be incorporated into said new product.

2. A method as recited in claim 1 wherein the step of providing a predetermined plurality of product attributes comprises the steps of providing a plurality of summary attributes and a clarifying definition for each of said summary attributes, said clarifying definition providing a relationship between each of said product attributes and the type of product under development.

3. A method as recited in claim 1 wherein the step of providing a predetermined plurality of product attributes includes the step of providing a detailed definition for each of said product attributes, each of said detailed definitions providing a context for each attribute as it relates to the product under development.

4. A method as recited in claim 1 wherein the step of placing each of said attributes in an attribute class includes the step of placing each attribute in one of three classes wherein said first class represents attributes which differentiate the product from competing products, said second class represents important attributes, but which do not differentiate the new product from competing products, and said third class represents otherwise desirable product attributes.

5. A method as recited in claim 4 her comprising the step of ranking each of said product attributes, said rank being related to each of said classes such that each of said attributes in said first class have a higher rank than each of said attributes in said second class and each of said attributes in said second class have a higher rank than each of said attributes in said third class.

6. A method as recited in claim 1 further comprising the step of generating a primary brand position as a function of said product attributes.

7. A method as recited in claim 1 further comprising the step of generating a present product brand position as a function of said product attributes.

8. A method as recited in claim 1 wherein the step of associating each of said product attributes with a preferred competitive level with respect to said competitive set includes the step of prioritizing each product attribute in one of four levels, said first level representing a desire for the product attribute to be a leader (L) with respect to the competitive set, said second level representing a desire for the product attribute to be among the leaders (A) with respect to the competitive set, said third level representing a desire for the product attribute to be competitive (C) with respect to the competitive set, and said fourth level representing a desire for the product attribute to be minimally competitive (M) with respect to the competitive set.

9. A method of developing a brand profile for a new automotive vehicle comprising the steps of:
    providing a plurality of vehicle attributes, said plurality including at least attributes from each of the following groups of vehicle characteristics: usage experience, driving experience, and design;
    grouping said product attributes in response to customer-oriented market research;
    placing each of said attributes in an attribute class corresponding to brand personality importance;
    thereafter, generating a preferred vehicle brand position as a function of said vehicle attributes via a processor including identifying a competitive set of products, and associating each of said vehicle attributes with a preferred competitive level with respect to said competitive set; and
    generating target vehicle characteristics as a function of said vehicle attributes and said preferred vehicle brand position via said processor, said target vehicle characteristics representing customer-driven objectives for each of said plurality of vehicle attributes to be incorporated into said new automotive vehicle.

10. A method as recited in claim 9 wherein the step of providing a plurality of vehicle attributes comprises the steps of providing a plurality of summary attributes and a clarifying definition for each of said summary attributes said clarifying definition providing further detail relating each of said vehicle attributes to a vehicle characteristic.

11. A method as recited in claim 9 wherein the step of providing a plurality of vehicle attributes includes the step of providing a detailed definition for each of said vehicle attributes each of said detailed definitions providing a context for each attribute as it relates to the vehicle under development.

12. A method as recited in claim 9 wherein the step of placing each of said vehicle attributes in an attribute class includes the step of placing each attribute in one of three classes wherein said first class represents attributes which will differentiate the vehicle from competing vehicles, said second class represents important attributes, but which do not differentiate the vehicle from competing vehicles, and said third class represents otherwise desirable vehicle attributes.

13. A method as recited in claim 12 further comprising the step of ranking each of said vehicle attributes, said rank being related to each of said classes such that each of said attributes in said first class have a higher rank than each of said attributes in said second class and each of said attributes in said second class have a higher rank than each of said attributes in said third class.

14. A method as recited in claim 13 wherein the step of ranking each of said attributes includes the step of ranking design attributes differently than usage experience attributes and driving experience attributes.

15. A method as recited in claim 14 wherein the step of classifying each of said attributes includes the step of classifying each design attribute on a scale having more gradients than the classification scale for classifying usage experience attributes or driving experience attributes.

16. A method as recited in claim 9 further comprising the step of ranking each of said vehicle attributes.

17. A method as recited in claim 9 further comprising the step of generating a primary brand position as a function of said vehicle attributes.

18. A method as recited in claim 9 further comprising the step of generating a present product brand position as a function of said vehicle attributes.

19. A method as recited in claim 9 wherein the step of associating each of said vehicle attributes with a preferred competitive level with respect to said competitive set includes the step of prioritizing each vehicle attribute in one of four levels, said first level representing a desire for the vehicle attribute to be a leader (L) with respect to the competitive set, said second level representing a desire for the vehicle attribute to be among the leaders (A) with respect to the competitive set, said third level representing a desire for the vehicle attribute to be competitive (C) with respect to the competitive set, and said fourth level representing a desire for the vehicle attribute to be minimally competitive (M) with respect to the competitive set.

20. A method of developing a brand profile for a new automotive vehicle comprising the steps of:
    providing a plurality of vehicle attributes, said plurality including at least attributes from each of the following groups of vehicle characteristics: usage experience, driving experience, and design;
    grouping said product attributes in response to customer-oriented market research;
    placing each of said attributes in an attribute class corresponding to brand personality importance;
    providing a cross-functional product team;
    providing target customer characteristics;
    providing target vehicle brand image characteristics;
    thereafter, generating a preferred vehicle brand position by said cross-functional product team as a function of said vehicle attributes, said target customer characteristics, and said target vehicle image characteristics via a computer; and
    generating target vehicle objectives by said cross-functional product team as a function of said vehicle attributes and said preferred vehicle brand position via said computer, said target vehicle objectives representing customer-driven and image-driven characteristics for each of said plurality of vehicle attributes to be incorporated into said new automotive vehicle.

21. A method as recited in claim 20 wherein the step of providing target customer characteristics comprises the step of providing a brand positioning summary.

22. A method as recited in claim 21 wherein said brand positioning summary includes target customer defining characteristics, target customer selection rationales, a summary of the new vehicles' role in the product portfolio, a competitive assessment, enduring reasons why a customer may purchase the new vehicle, and pricing considerations.

23. A method as recited in claim 20 wherein the step of providing target vehicle image characteristics comprises the step of providing a brand bullseye.

24. A method as recited in claim 20 wherein said cross-functional product team includes at least one member from each of the following corporate departments: vehicle program management, marketing, purchasing, finance, engineering, and design.

* * * * *